United States Patent [19]

Ballard

[11] 4,332,618

[45] Jun. 1, 1982

[54] THERMAL BARRIER COATING

[75] Inventor: Norman E. Ballard, Derby, England

[73] Assignee: Rolls-Royce Limited, London, England

[21] Appl. No.: 261,938

[22] Filed: May 8, 1981

[30] Foreign Application Priority Data

Jul. 25, 1980 [GB] United Kingdom ............... 8024433

[51] Int. Cl.$^3$ ............................................. C04B 19/04
[52] U.S. Cl. ........................................ 106/84; 501/17; 501/20; 501/21
[58] Field of Search ............... 501/17, 20, 21; 106/84

[56] References Cited

U.S. PATENT DOCUMENTS 3,256,105 6/1966 Alford et al. ..................... 106/84
3,389,002 6/1968 Huffcut ............................ 106/84
3,957,501 5/1976 Matsuda et al. ................. 106/84

*Primary Examiner*—James Poer
*Attorney, Agent, or Firm*—Cushman, Darby & Cushman

[57] ABSTRACT

A thermal barrier coating adapted to provide a thermally insulating protective barrier on a component, the coating being capable of being applied to the components by spraying methods and being ductile when exposed to high temperatures. The coating comprises a mixture containing constituents of finely divided hollow glass microspheres; a ceramic frit of finely divided particles of alkali silicate titanate glass; and a refractory filler material of finely divided partiles such as micronized mica; aluminum oxide of mullite. All of the constituents of the mixture are suspended in a high temperature resistant binder material such as potassium silicate, sodium silicate or aluminum orthophosphate.

7 Claims, No Drawings

THERMAL BARRIER COATING

This invention relates to thermal barrier coatings, that is, coatings adapted to provide a thermally insulating protective barrier on a component.

In the field of gas turbine engines, the pursuit of increased performance and efficiency has led to a steady increase in the temperatures at which engine components are required to operate. This has led in turn to increasingly elaborated and costly systems for cooling these components in addition to the use of expensive heat resistant materials in their construction.

It is an object of the present invention to provide a coating composition which is thermally insulating and suitable for protecting components from the effects of high temperatures.

Thus by providing components with a thermally insulating coating, their operating temperatures are reduced, thereby permitting the use of less elaborate systems for their cooling or indeed no cooling at all as well as the use of less expensive materials in their construction.

According to the present invention, a coating composition suitable for use as a thermal barrier coating comprises a mixture containing finely divided hollow glass microsphere, finely divided particles of a ceramic frit, and finely divided particles of a refractory filler material, all suspended in a binder material.

The nature of the binder material depends upon the temperatures to which the coating is likely to be exposed. Thus for high temperature applications i.e. up to about 600° C., a suitable binder material may be a solution of sodium or potassium silicate, or alternatively a solution of aluminium orthophosphate. The preferred solution is of potassium silicate containing 34% total solids and having a mean weight ratio o $SiO_2:K_2O$ of 2. However other potassium silicate solutions having mean weight ratios of up to 2.2 and total solids between 27 and 40% may be utilised. If a sodium silicate solution is utilised then solutions having mean weight ratios of $SiO_2:Na_2O$ of 2.0 to 3.4 may be used.

It is preferred that the ratio of refractory filler material to hollow glass microspheres to ceramic frit is 40:33:27, all in parts by weight. However, any one of those constituents may be reduced by up to 50% by weight and the weights of each of the remaining constituents increased in weight by half that reduction in weight.

We have found that the optimum ratio of the total combined weight of the refractory filler material, hollow glass microspheres and ceramic frit to the weight of binder material is 1:1. However this may be reduced to 1:0.75 or increased to 1:1.1. If the ratio falls outside this range, we have found that the coating composition, when applied to a substrate, tends to flake off when cooled down from high temperatures.

The ceramic frit is added to the coating composition in order to confer a certain degree of ductility to the coating composition when it is exposed to high temperatures. This ductility, we have found, reduces the incidence of cracking of the coating composition as a result of thermal gradients within the composition. When the coating composition is required to operate at temperatures of up to 600° C., we have found that an alkali silicate titanate glass having a softening temperature range of 420° to 448° C. is a suitable ceramic frit.

The coating composition in accordance with the present invention is applied to components to be protected by conventional paint spraying methods. The refractory filler material is present in the coating composition in order to improve its spraying characteristics. Suitable refractory filler materials are micronised mica, finely divided aluminium oxide and finely divided mullite.

In order to investigate the thermal conductivity properties of coating compositions in accordance with the present invention, a test piece made from 12% chromium steel was sprayed with a coating composition in accordance with the present invention and containing the following constituents by weight:

| | |
|---|---|
| Micronised mica | 40 parts |
| Hollow glass microspheres | 33 parts |
| Ceramic Frit | 27 parts |
| Binder | 100 parts |
| Water | Sufficient to attain a sprayable consistency. |

The hollow glass microspheres were of particle size −75 to 35 microns and made from calcium alumino silicate. They are marketed by Messrs. Fillite Ltd under the name "Fillite".

The ceramic frit consisted of a finely divided alkali silicate titanate glass containing $SiO_2$, $TiO_2$, $Na_2O$ and $K_2O$ as major constituents and $B_2O_3$ $P_2O_5$ SeO ZnO CdO $Li_2O$ and $Al_2O_3$ as minor constituents. The frit had a softening point in the temperature range 420°–440° C. and a particle size of less than 200 microns.

The binder was aqueous potassium silicate solution containing 34% by weight total solids and having a means weight ratio of $SiO_2:K_2O$ of 2.00.

A number of coats of the coating composition were sprayed on to the test piece with the test piece being heated at 150° C. for 1 hour between coats. This heat treatment was to drive off water added to the coating composition. Sufficient coats were applied to build up a coating thickness of 0.020". The coat was then heated at 560° C. for one hour in order to drive off combined water and fuse the ceramic frit.

The thermal conductivity of the coating was then determined by conventional means and found to be $0.4 \times 10^{-2}$ watts/cm/°K.

We have found by experiment that if the refractory filler material is micronised mica, it is only possible to provide a coating thickness of up to 0.025" thick. Above this thickness, flaking of the coating tends to occur at high temperatures. It is believed that this may be due at least in part to the physical shape of the mica particles. We prefer therefore that in certain applications, the micronised mica is replaced by finely divided particles of aluminium oxide.

A coating composition similar to that described previously but containing 40 parts by weight of −270 mesh aluminium oxide particles in place of the micronised mica was made up. It was applied to a 12% chromium steel test piece under the same conditions as those described previously until a thickness of 0.020" had been built up. It was then heated at 560° C. for 1 hour as before in order to drive off combined water and fuse the ceramic frit. Thermal conductivity tests revealed that this coating too had a thermal conductivity of $0.4 \times 10^{-2}$ watts/cm/°K.

We have found, that coating compositions in accordance with the present invention which contain finely divided aluminium oxide in place of micronised mica may be sprayed up to a depth of 0.035" without the subsequent occurence of flaking.

Coating compositions in accordance with the present invention are particularly suitable for use as thermal barrier coatings in gas turbine engines although their use is not restricted to such engines. Thus for instance, the coatings may be used for providing a thermal barrier coating on gas turbine engine discs and both rotor and stator aerofoil blades. It will be apparent however that there are numerous other applications in which coating compositions in accordance with the present invention would be an effective thermal barrier.

I claim:

1. A coating composition for use as a thermal barrier coating comprising a mixture containing constituents of finely divided hollow glass microspheres, a ceramic frit of finely divided particles of an alkali silicate titanate glass and finely divided particles of a refractory filler material selected from the group consisting of micronized mica, aluminum oxide and mullite, the ratio of the refractory filler material to the hollow glass microspheres to the alkali silicate titanate glass varying from 40:33:27, all in parts by weight so that any one of said constituents may be reduced by up to 50% by weight and the weight of each of the remaining constituents is increased in weight by half said reduction in weight of said one constituent, said constituents being suspended in a binder material.

2. A coating composition as claimed in claim 1 wherein the ratio of the total combined weight of the refractory filler material, hollow glass microspheres and alkali silicate titanate glass to the weight of the binder material is within the range of 1:0.75 to 1:1.1.

3. A coating composition as claimed in claim 1 wherein said binder material is a solution of potassium silicate having a mean weight ratio of $SiO_2:K_2O$ of 2.0 to 2.2.

4. A coating composition as claimed in claim 1 wherein said binder material is a solution of sodium silicate having a mean weight ratio of $SiO_2:Na_2O$ of 2.0 to 3.4.

5. A coating composition as claimed in claim 1 wherein said alkali silicate titanate glass has a softening temperature range of 420° to 448° C.

6. A coating composition as claimed in claim 1 wherein said hollow glass microspheres are made from calcium alumino silicate.

7. A coating composition as claimed in claim 1 wherein said binder material is selected from the group consisting of sodium silicate, potassium silicate and aluminium orthophosphate.

* * * * *